(12) United States Patent
Keller et al.

(10) Patent No.: US 9,950,701 B2
(45) Date of Patent: Apr. 24, 2018

(54) TIRE PRESSURE SENSOR WITH INCLUDED POSITION SENSOR

(71) Applicant: GOODRICH CORPORATION, Charlotte, NC (US)

(72) Inventors: Steven Keller, Union, OH (US); Paul L. Summers, Troy, OH (US); Lane B. Robbins, Pleasant Hill, OH (US); Scott Streng, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 799 days.

(21) Appl. No.: 14/531,746

(22) Filed: Nov. 3, 2014

(65) Prior Publication Data

US 2016/0214585 A1 Jul. 28, 2016

(51) Int. Cl.
| | |
|---|---|
| *G01F 3/02* | (2006.01) |
| *B60T 8/172* | (2006.01) |
| *B60T 8/17* | (2006.01) |
| *G01M 17/02* | (2006.01) |
| *G01P 3/44* | (2006.01) |
| *B60C 23/00* | (2006.01) |
| *B60C 23/04* | (2006.01) |

(52) U.S. Cl.
CPC ............ *B60T 8/1725* (2013.01); *B60C 23/00* (2013.01); *B60C 23/0408* (2013.01); *B60C 23/0488* (2013.01); *B60T 8/1703* (2013.01); *G01M 17/02* (2013.01); *G01P 3/44* (2013.01); *B60C 2200/02* (2013.01)

(58) Field of Classification Search
CPC ............ B60C 2200/02; B60C 23/0408; B60C 23/0474; B64D 2045/0085; B64D 45/00
See application file for complete search history.

(56) References Cited

U.S. PATENT DOCUMENTS

| | | | |
|---|---|---|---|
| 9,702,349 B2 * | 7/2017 | Anderson | ................ F03G 7/08 |
| 2004/0075022 A1 | 4/2004 | Mackness | |
| 2005/0251306 A1 * | 11/2005 | Gowan | ................ B60T 8/1703 701/71 |
| 2010/0271191 A1 | 10/2010 | De Graff et al. | |
| 2013/0278771 A1 * | 10/2013 | Magoun | ................ H04N 5/33 348/148 |
| 2015/0224831 A1 | 8/2015 | Miller | |

FOREIGN PATENT DOCUMENTS

WO 2009070067 6/2009

OTHER PUBLICATIONS

Extended European Search Report dated Mar. 7, 2016 in European Application No. 15192637.5.

* cited by examiner

*Primary Examiner* — Elias Desta
(74) *Attorney, Agent, or Firm* — Snell & Wilmer LLP

(57) ABSTRACT

What is described is a tire pressure sensor for use in a wheel of aircraft landing gear. The tire pressure sensor includes a position sensor configured to detect a movement of the wheel and generate a wheel movement signal based on the movement. The tire pressure sensor also includes a processor coupled to the position sensor. The processor is configured to receive the wheel movement signal, determine a wheel rotational speed of the wheel based on the wheel movement signal and generate a wheel rotational speed signal based on the wheel rotational speed.

17 Claims, 4 Drawing Sheets

TIRE PRESSURE SENSOR WITH INCLUDED POSITION SENSOR

FIELD

The present disclosure relates to aircraft landing gear, wheels and brakes, and more particularly, to a system for determining rotational speed of a wheel of an aircraft.

BACKGROUND

Aircraft wheels and brakes and aircraft wheels are designed for stopping an aircraft after landing or during a rejected take-off. The brakes may be controlled by a brake control system. The brake control system may utilize wheel rotational speed within braking control algorithms. The brake control system typically receives wheel rotational speed information from wheel rotational speed transducers that rotate with the wheel. The wheel rotational speed algorithms are dependent upon wheel rotational speed signals, so it is desirable for wheel rotational speed to be provided to the brake control system in the event of a failure of a wheel rotational speed transducer.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is described is a tire pressure sensor for use in a wheel of aircraft landing gear. The tire pressure sensor includes a position sensor configured to detect a movement of the wheel and generate a wheel movement signal based on the movement. The tire pressure sensor also includes a processor coupled to the position sensor. The processor is configured to receive the wheel movement signal, determine a wheel rotational speed of the wheel based on the wheel movement signal and generate a wheel rotational speed signal based on the wheel rotational speed.

Also described is a method for determining a rotational speed of a wheel for use in landing gear of an aircraft. The method includes detecting, using a position sensor, a movement of the wheel. The method also includes generating, using the position sensor, a wheel movement signal based on the movement of the wheel. The method also includes determining, using a processor, a speed of the wheel based on the wheel movement signal. The method also includes generating, using the processor, a wheel rotational speed signal based on the angular speed of the wheel.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
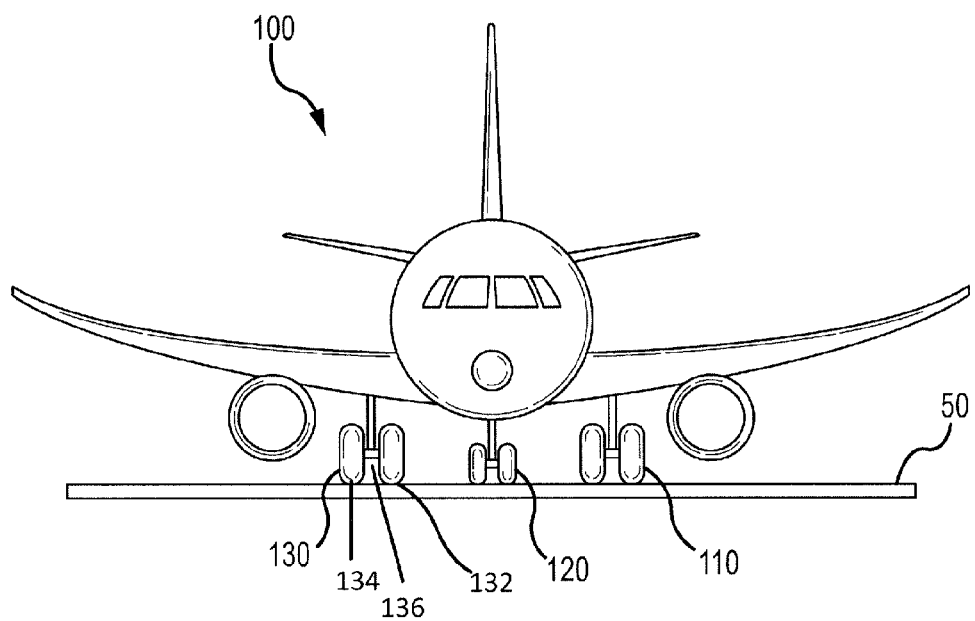
FIG. 1 illustrates an aircraft positioned on a runway, in accordance with various embodiments.

FIG. 1 illustrates an aircraft 100 positioned on a runway 50, in accordance with various embodiments. Aircraft 100 may have landing gear including right main landing gear 130, left main landing gear 110 and nose landing gear 120. Each landing gear may include two wheels. For example, right main landing gear 130 includes right outboard wheel 134 and right inboard wheel 132 positioned on opposite ends of an axle 136. Although a T-gear type landing gear aircraft is depicted, it should be appreciated that the concepts described herein are applicable to aircraft having multiple axle pairs per landing gear and aircraft with more than two main landing gears. Additionally, the concepts disclosed herein apply to two wheeled aircraft (i.e., one wheel for each main landing gear).

While aircraft 100 is in motion but not airborne (i.e., in contact with runway 50 via wheels), the wheels of the landing gear may rotate, thus allowing aircraft 100 to move. It may be desirable to be able to determine the rotational speed of the wheel relative to runway 50 (i.e., rotational speed, which may be measured in radians per second, revolutions per minute, etc.). This speed may be provided to a brake control system of aircraft 100 and/or a display within the cockpit of aircraft 100.

Figure 2:
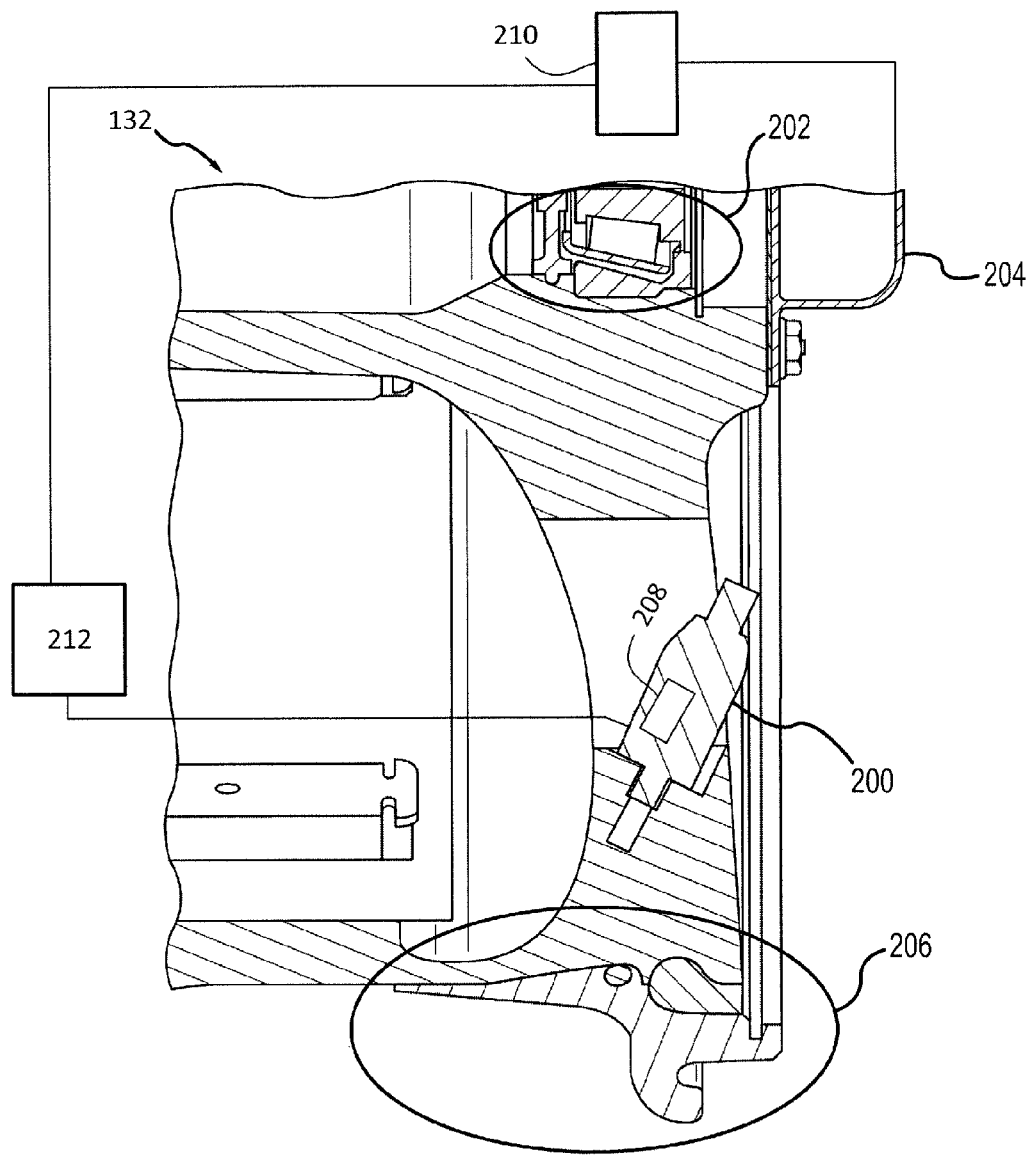
FIG. 2 illustrates a right inboard wheel of the aircraft of FIG. 1, in accordance with various embodiments.

FIG. 2 illustrates right inboard wheel 132 of aircraft 100. While components illustrated in FIG. 2 are illustrated on right inboard wheel 132, one skilled in the art will realize that similar components may be positioned on each wheel of aircraft 100.

Right inboard wheel 132 includes a tire pressure sensor 200, a wheel bearing 202, a hubcap 204 and a wheel assembly 206. Right inboard wheel 132 may also include a wheel rotational speed transducer 210. A brake control system 212 may be connected to right inboard wheel 132.

Wheel bearing 202 may be adapted to allow right inboard wheel 132 to rotate freely about axle 136 (axle 136 being the axis of rotation). Wheel assembly 206 may be adapted to allow right inboard wheel 132 to remain attached to right main landing gear 130. Hubcap 204 may drive wheel rotational speed transducer 210 as well as protect right inboard wheel 132 from debris and/or moisture.

Where used herein, "wheel rotational speed" refers to the rotational speed of a wheel, for example, of right inboard wheel 132.

With brief reference to FIG. 1, while aircraft 100 is in motion and not airborne, a speed of the aircraft 100 relative to runway 50 may be determined based on the rotational speed of right inboard wheel 132 about axle 136. For example, the linear velocity of aircraft 100 relative to runway 50 may be determined by solving the equation $v=r*\omega$, where v indicates the linear velocity (speed of aircraft 100 relative to runway 50), r indicates the effective radius of the tire positioned on right inboard wheel 132 and $\omega$ indicates wheel rotational speed. Wheel rotational speed transducer 210 may be adapted to determine this rotational speed of right inboard wheel 132 about axle 136. Wheel rotational speed transducer 210 may convert rotational wheel speed of right inboard wheel 132 into a signal, such as a periodic signal or a voltage signal. A processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof, within wheel rotational speed transducer 210, brake control system 212, or elsewhere, may determine the speed of aircraft 100 relative to runway 50 based on the rotational speed of right inboard wheel 132 about axle 136.

Brake control system 212 may be connected to wheel rotational speed transducer 210. Brake control system 212 may include a processor and a tangible, non-transitory storage medium. In that regard, brake control system 212 may be capable of implementing control logic, such as braking control algorithms for controlling the braking of aircraft 100. The braking control algorithms may be based on data provided by wheel rotational speed transducer 210. That is to say, the brake control algorithms may use the rotational speed of right inboard wheel 132 provided by wheel rotational speed transducer 210 in order to properly brake aircraft 100. In various embodiments, wheel rotational speed transducer may determine the speed of aircraft 100 relative to runway 50 and provide that speed to brake control system 212.

Because wheel rotational speed is used in the brake control algorithms, it is desirable for brake control system 212 to receive wheel rotational speed information in the event wheel rotational speed transducer 210 is not providing a wheel rotational speed. In order to provide a second source of wheel rotational speed information to brake control system 212, a position sensor 208 may be positioned on tire pressure sensor 200.

Tire pressure sensors may include electronic components, such as a processor, that are capable of converting a movement signal (such as a signal indicating angular velocity or angular acceleration) generated by a position sensor into a signal indicative of wheel rotational speed. As such, position sensor 208 may be used to detect a movement, such as angular displacement, angular velocity or angular acceleration of right inboard wheel 132. Position sensor 208 may generate a wheel movement signal that indicates a measure of the movement (angular displacement, angular velocity or angular acceleration) of right inboard wheel 132. Tire pressure sensor 200 may be adapted to convert the wheel movement signal into a wheel rotational speed and generate a wheel rotational speed signal based on the wheel rotational speed. For example, tire pressure sensor 200 may be adapted to convert an angular acceleration into an angular velocity. Thus, by incorporating a position sensor (such as position sensor 208) into a tire pressure sensor (such as tire pressure sensor 200), a measure of wheel rotational speed of right inboard wheel 132 may be determined.

Position sensor 208 may be a one, two, three or more axis position sensor, such as, for example, an accelerometer; a Hall effect sensor or magnetic sensor; a gravity sensor; a gyroscope; an inclinometer; or other similar device. Position sensor 208 may be adapted to generate a wheel movement signal based on a detected movement of right inboard wheel 132. This wheel movement signal may correlate to wheel rotational speed of right inboard wheel 132.

In various embodiments, an accelerometer is used as position sensor 208. An accelerometer is small in size and requires little power for operation. The movement detected by an accelerometer is sufficient to provide an accurate wheel rotational speed. The accelerometer may be of a piezoelectric type, a hall effect type, a piezoresistive type, magnetorestrictive type, and/or a heat transfer type. The accelerometer may measure the acceleration of right inboard wheel 132 relative to freefall. Stated another way, the accelerometer may determine the proper acceleration of right inboard wheel 132. Also stated another way, an accelerometer may detect movement of right inboard wheel 132 by detecting its acceleration.

In various embodiments, a gyroscope is used as position sensor 208. A gyroscope may provide more detailed information than an accelerometer.

Traditionally, a brake control system may be connected to a tire pressure sensor, as braking control algorithms within a brake control system may utilize tire pressure data received from the tire pressure sensor. Likewise, brake control system 212 may be connected to tire pressure sensor 200. Wheel rotational speed data from position sensor 208 may be provided to brake control system 212 via the connection between brake control system 212 and tire pressure sensor 200. In various embodiments, an additional connection may be provided between position sensor 208 and brake control system 212.

Figure 3:
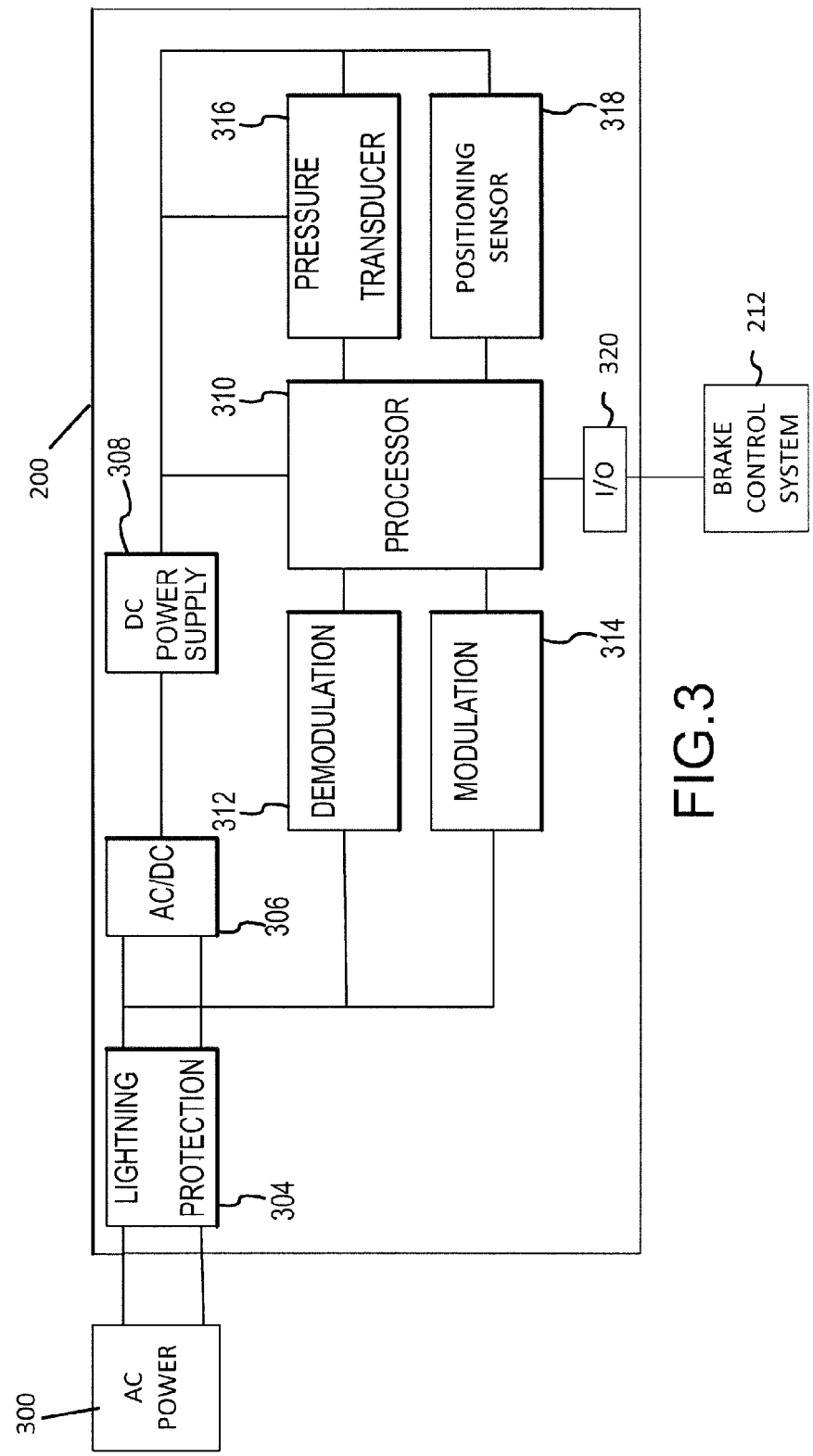
FIG. 3 illustrates a block diagram of a tire pressure sensor including a position sensor, in accordance with various embodiments.

FIG. 3 illustrates a block diagram of tire pressure sensor 200. Tire pressure sensor 200 may include a lightning protection module 304, an alternating current (AC) to direct current (DC) converter module 306, a DC power supply module 308, a processor module 310, a demodulation module 312, a modulation module 314, a pressure transducer module 316, an input/output (I/O) module 320 and a position sensor module 318. Power may be provided to tire pressure sensor 200 via a power module such as AC power module 300. Tire pressure sensor 200 may communicate with brake control system 212 via an I/O module 320.

AC power module 300 may provide alternating current power to tire pressure sensor 200. Lightning protection module 304 may provide protection to components within tire pressure sensor 200 against a voltage spike on the line from AC power module 300 to tire pressure sensor 200. AC/DC converter module 306 may convert the alternating current power signal provided by AC power module 300 to direct current power. Other components within tire pressure sensor 200 may be digital and thus operate via DC power. DC power provided by AC/DC converter module 306 may be stored by DC power supply module 308, which may regulate the voltage and provide the regulated voltage to the modules of tire pressure sensor 200. In various embodiments, DC power may be supplied directly to tire pressure sensor 200, such that AC power module 300 is a DC power module and AC/DC converter module 306, lightning protection module 304, and/or DC power supply module 308 may not be necessary within tire pressure sensor 200.

Pressure transducer module 316 may include a transducer that is capable of detecting a pressure within a tire about right inboard wheel 132. Pressure transducer module 316 may receive power from DC power supply module 308.

Position sensor module 318 may include position sensor 208. Position sensor module 318 may detect movement of right inboard wheel 132 and generate a wheel movement signal based on the detected movement. For example, if position sensor 208 is an accelerometer, the wheel movement signal may indicate an angular acceleration of right inboard wheel 132. If position sensor module 318 is a gyroscope, the wheel movement signal may indicate an angular velocity of right inboard wheel 132. Position sensor module 318 may receive power from DC power supply module 308.

Processor module 310 may be connected to pressure transducer module 316 and position sensor module 318 and receive power from DC power supply module 308. Processor module 310 may include a processor and a tangible, non-transitory memory and be capable of implementing logic. The processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof. For example, processor module 310 may receive signals generated by pressure transducer module 316 and convert the signals into a pressure value and/or a temperature value.

Processor module 310 may also receive the wheel movement signals generated by position sensor module 318 and determine a wheel rotational speed based on the wheel movement signals. In embodiments where position sensor module 318 is an accelerometer, processor module 310 may convert the detected acceleration into an angular velocity of right inboard wheel (i.e., wheel rotational speed). For example, the wheel rotational speed may be calculated using the equation $$\frac{d\omega}{dt} = \frac{a(T)}{r},$$

where ω is the angular velocity, a(T) is the linear tangential acceleration and r is the effective radius of the tire positioned on right inboard wheel 132. In various embodiments, the wheel movement signal may be an analog signal and processor module 310 may convert the analog signal into a digitized wheel movement signal, which includes wheel movement information. In various embodiments, processor module 310 may output the digitized wheel movement signal instead of or in addition to a wheel rotational speed signal. The digitized wheel movement signal and/or the wheel rotational speed signal may be transmitted by processor module 310 to I/O module 320 where it is transmitted to brake control system 212 to be used in brake control algorithms.

I/O module 320 may be adapted to transmit and receive signals to and from brake control system 212. I/O module 320 may be connected to processor module 310 and to brake control system 212. I/O module 320 may receive a signal from processor module 310 and transmit the signal to brake control system 212 and/or receive a signal from brake control system 212 and transmit the signal to processor module 310.

The signal received at I/O module 320 from brake control system 212 may be modulated for ease of transmission. In response to receiving the modulated signal, processor module 310 may transmit the modulated signal to demodulation module 312, which demodulates the signal. The demodulated signal may then be provided to processor module 310 for processing.

In various embodiments, it may be preferred for I/O module 320 to transmit modulated signals to brake control system 212. Prior to transmitting a signal to I/O module 320 for transmission to brake control system 212, processor module 310 may provide the signal to modulation module 314. Modulation module 314 may then modulate the signal and transmit the modulated signal to processor module 310. Processor module 310 may then transmit this modulated signal to I/O module 320 to be transmitted to brake control system 212.

In various embodiments, I/O module 320 may not exist and the brake control system may be positioned where AC power module 300 is positioned. In these embodiments, the brake control system may provide the AC power to tire pressure sensor 200.

Tire pressure sensor 200 may be indicative of a traditional tire pressure sensor except for the inclusion of position sensor module 318. Because traditional tire pressure sensors may include a DC power supply module and a processor module, a traditional tire pressure sensor may be adapted to provide wheel rotational speed information by inclusion of a position sensor module. In various embodiments, the processor module of the traditional tire pressure sensor may be reprogrammed in order to generate wheel rotational speed information.

Figure 4:
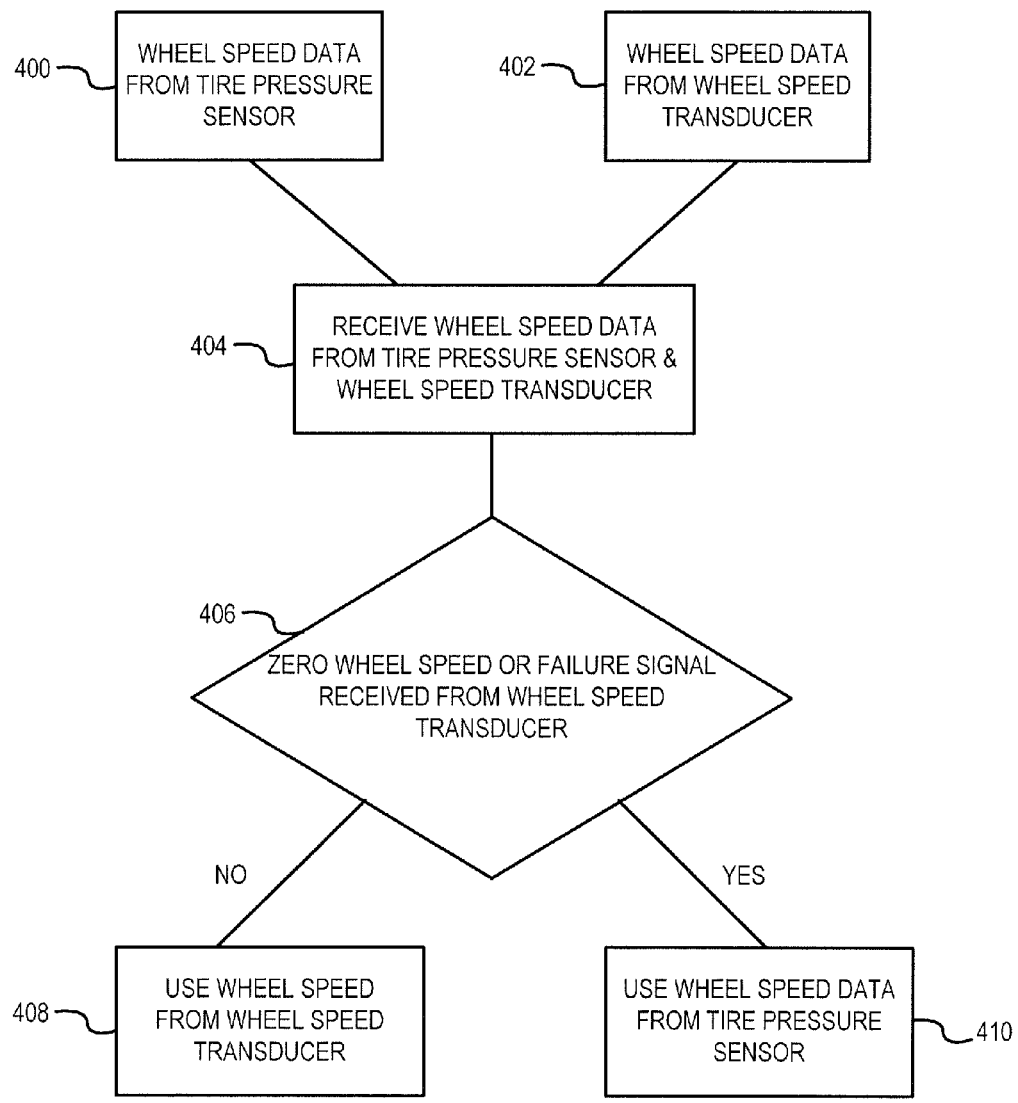
FIG. 4 is a flow chart illustrating logic for selection of wheel rotational speed data from a tire pressure sensor or a wheel rotational speed transducer by a brake control system.

FIG. 4 is a flow chart illustrating logic for selection of wheel rotational speed data from tire pressure sensor 200 or wheel rotational speed transducer 210 by brake control system 212. In block 400, wheel rotational speed data is generated by tire pressure sensor 200. In block 402, wheel rotational speed data is generated by wheel rotational speed transducer 210. In block 404, brake control system 212 receives wheel rotational speed data from tire pressure sensor 200 and wheel rotational speed transducer 210.

In block 406, it is determined whether a zero wheel rotational speed or a failure signal is received from wheel rotational speed transducer 210. If wheel rotational speed transducer 210 is generating a zero wheel rotational speed, it may indicate that aircraft 100 is at rest, that aircraft 100 is moving at less than 10 knots, that no signal is being generated by wheel rotational speed transducer 210 or the like. If wheel rotational speed transducer is generating a zero wheel rotational speed, then wheel rotational speed data from tire pressure sensor 200 may be utilized, as indicated in block 410. If aircraft 100 is at rest, then wheel rotational speed may be detected by tire pressure sensor 200 at an earlier point in time than by wheel rotational speed transducer 210, as wheel rotational speed transducer may not detect aircraft movement below 10 knots. Likewise, if aircraft 100 is moving at less than 10 knots, wheel rotational speed detected by tire pressure sensor 200 may be more accurate than wheel rotational speed transducer 210. In any of these conditions, it may be preferable to receive wheel rotational speed from tire pressure sensor 200.

If wheel rotational speed transducer 210 is generating a failure signal, it may indicate that wheel rotational speed generated by wheel rotational speed transducer 210 is incorrect. In this condition, wheel rotational speed generated by tire pressure sensor 200 may be used, as indicated in block 410. Many types of signals may indicate a failure signal. For example, a lack of a signal may represent a failure signal. Likewise, an unreasonable value transmitted over a predetermined time period, such as a wheel rotational speed above 10000 rotations per minute over a 500 millisecond period, may represent a failure signal. Wheel rotational speed transducer 210 may include logic such that it may determine if it has an electrical failure, a mechanical failure, a logical failure or any other type of failure that causes it to detect incorrect values, and in response, generate a failure signal. As described, in the event of a failure signal received from wheel rotational speed transducer 210, it may be preferable to utilize wheel rotational speed received from tire pressure sensor 200.

If wheel rotational speed transducer 210 is not generating a zero wheel rotational speed or a failure signal, then wheel rotational speed generated by wheel rotational speed transducer 210 may be utilized, as indicated in block 408.

With reference to FIG. 2, benefits of the present invention are illustrated. As mentioned above, brake control system 212 receives wheel rotational speed information from wheel rotational speed transducer 210. If this signal is not received from wheel rotational speed transducer 210, then the braking control algorithms performed by brake control system 212 may not provide optimal output. In response, braking control algorithms performed by brake control system 212 may be performed using the wheel rotational speed signal or digitized wheel movement signal from tire pressure sensor 200.

Angular velocity or angular acceleration may be measured by position sensor 208. This angular velocity or acceleration may be detected relative to one axis, two axes, three axes, etc. Acceleration or velocity profiles may be constructive to be indicative of normal motion of aircraft 100 or other states, such as loose components.

For example, after a period of use, wheel bearing 202 may become loose and/or wear out. When wheel bearing 202 becomes loose and/or wears out, distinct vibrations may be detectable at right inboard wheel 132, such as a distinct and/or repetitive movement in one or two axes of position sensor 208. In response, position sensor 208 may detect these distinct vibrations. Returning momentarily to FIG. 3, processor module 310 may receive a signal from position sensor 208 indicating the distinct vibrations. Processor module 310 may be able to determine that wheel bearing 202 is loose and/or worn out based on the detected vibrations by comparison to an acceleration or velocity profile of a known failure mode of wheel bearing 202. Thus, position sensor 208 in combination with processor module 310 may determine a status of wheel bearing 202.

With reference to FIG. 1, after a period of use, right inboard wheel 132 and right outboard wheel 134 may have changed position relative to each other and/or relative to aircraft 100. This may likewise cause distinct vibrations that may be distinct from vibrations caused by wearing of wheel bearing 202. In response, position sensor 208 may detect these distinct vibrations. Returning momentarily to FIG. 3, processor module 310 may receive a signal from position sensor 208 indicating the distinct vibrations. Processor module 310 may determine that right inboard wheel 132 and right outboard wheel 134 have shifted position relative to each other based on the detected vibrations. Thus, position sensor 208 in combination with processor module 310 may determine a status of landing gear.

With reference to FIG. 2, after a period of use, hubcap 204 may become loose. This may cause distinct vibrations that may be distinct from vibrations caused by wearing of wheel bearing 202 and repositioning of right inboard wheel 132 and right outboard wheel 131. In response, position sensor 208 may detect these distinct vibrations. Processor module 310 may determine that hubcap 204 has become loose based on the detected vibrations. Thus, position sensor 208 in combination with processor module 310 may determine a status of hubcap 204, such as whether hubcap 204 is loose or not.

In various embodiments, aircraft 100 may be an autonomous aircraft such that it is piloted remotely. Wheel rotational speed transducer 210 may not detect speeds under 10 knots. For an autonomous aircraft, it is desired to be able to detect speeds below 10 knots so that the controller of the aircraft can determine whether the aircraft is in motion. Position sensor 208 in combination with processor module 310 may be able to determine any speeds above 0 knots.

With reference to FIG. 1, each wheel of right main landing gear 130, left main landing gear 110 and nose landing gear 120 may include a tire pressure sensor. A position sensor may be positioned on each tire pressure sensor of each wheel. This is advantageous as wheel rotational speed for each wheel of aircraft 100 may be detected, thus a speed of aircraft 100 relative to runway 50 may be detected most accurately.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A tire pressure sensor for use in a wheel of landing gear of an aircraft, the tire pressure sensor comprising:
   a housing having features to facilitate connection of the housing to the wheel such that the housing rotates with the wheel;
   a position sensor positioned at least one of in or on the housing and configured to rotate with the wheel relative to the aircraft, to detect a movement of the wheel, and to generate a wheel movement signal based on the movement; and
   a processor coupled to the position sensor and configured to:
      receive the wheel movement signal,
      determine a wheel rotational speed of the wheel based on the wheel movement signal, and
      generate a wheel rotational speed signal based on the wheel rotational speed.

2. The tire pressure sensor of claim 1, wherein the position sensor is an accelerometer.

3. The tire pressure sensor of claim 1, wherein the position sensor is a gyroscope.

4. The tire pressure sensor of claim 1, wherein the landing gear is at least one of a main landing gear or a nose landing gear.

5. The tire pressure sensor of claim 1, wherein the processor is coupled to a brake control system and further configured to transmit the wheel rotational speed signal to the brake control system.

6. The tire pressure sensor of claim 1, further comprising a power supply module configured to provide direct current power to the position sensor and to the processor.

7. The tire pressure sensor of claim 1, further comprising a demodulation module coupled to the processor and configured to demodulate a first signal and a modulation module coupled to the processor and configured to modulate a second signal.

8. The tire pressure sensor of claim 1, wherein the wheel movement signal indicates an angular acceleration of the wheel.

9. The tire pressure sensor of claim 1, wherein the processor is further configured to determine at least one of a status of a wheel bearing of the wheel, a status of a hubcap of the wheel or a status of the landing gear based on the wheel movement signal.

10. A system for determining a rotational speed of a wheel for use in landing gear of an aircraft, the system comprising:
    a tire pressure sensor mounted to the wheel, configured to rotate with the wheel, and having a pressure transducer module configured to detect pressure data corresponding to a tire pressure of a tire positioned on the wheel; and
    a position sensor positioned at least one of in or on the tire pressure sensor and configured to rotate along with the wheel, to detect a movement of the wheel, and to generate a wheel movement signal based on the movement.

11. The system of claim 10, further comprising a processor coupled to the position sensor and configured to:
    receive the wheel movement signal; and
    determine the rotational speed of the wheel based on the wheel movement signal.

12. The system of claim 11, wherein the processor is coupled to a brake control system and is further configured to generate a wheel rotational speed signal based on the rotational speed of the wheel and transmit the wheel rotational speed signal to the brake control system.

13. The system of claim 11, wherein the processor is further configured to determine at least one of a status of a wheel bearing of the wheel, a status of a hubcap of the wheel or a status of the landing gear based on the wheel movement signal.

14. The system of claim 10, wherein the position sensor is an accelerometer.

15. The system of claim 10, wherein the position sensor is a gyroscope.

16. The system of claim 12, wherein the processor is further configured to transmit, to the brake control system, pressure output data corresponding to the pressure data detected by the pressure transducer module.

17. The system of claim 12, further comprising:
    a wheel rotational speed transducer configured to output a transducer wheel rotational speed signal; and
    the brake control system, wherein the brake control system is configured to control a braking operation based on the transducer wheel rotational speed signal in response to determining that the transducer wheel rotational speed signal has a value greater than zero, and to control the braking operation based on the wheel rotational speed signal in response to determining that the transducer wheel rotational speed signal is at least one of zero or a failure signal.

* * * * *